(12) United States Patent
Yamagishi

(10) Patent No.: US 10,313,739 B2
(45) Date of Patent: Jun. 4, 2019

(54) TERMINAL DEVICE, RELAY DEVICE, INFORMATION PROCESSING METHOD, PROGRAM, AND CONTENT IDENTIFICATION SYSTEM

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 1 day.

(21) Appl. No.: 15/463,758

(22) Filed: Mar. 20, 2017

(65) Prior Publication Data

US 2017/0286409 A1  Oct. 5, 2017

Related U.S. Application Data

(63) Continuation of application No. 14/379,590, filed as application No. PCT/JP2013/056946 on Mar. 13, 2013, now abandoned.

(30) Foreign Application Priority Data

Mar. 21, 2012 (JP) ................................ 2012-063374

(51) Int. Cl.
*G06F 16/14* (2019.01)
*G06F 16/48* (2019.01)
(Continued)

(52) U.S. Cl.
CPC ....... *H04N 21/4345* (2013.01); *G06F 16/152* (2019.01); *G06F 16/48* (2019.01);
(Continued)

(58) Field of Classification Search
CPC ............. H04N 21/4345; H04N 21/437; H04N 21/43615; G06F 17/30038; G06F 17/30109; H04W 88/04
See application file for complete search history.

(56) References Cited

U.S. PATENT DOCUMENTS 7,908,133 B2  3/2011 Neuhauser
2005/0044561 A1  2/2005 McDonald
(Continued)

FOREIGN PATENT DOCUMENTS

EP    2 275 949    1/2011
JP    2006-50237   2/2006
(Continued)

OTHER PUBLICATIONS

Extended European Search Report for European Application No. 13764853.1 dated Feb. 24, 2016 in English Language.
(Continued)

*Primary Examiner* — Charles V Hicks
(74) *Attorney, Agent, or Firm* — Oblon, McClelland, Maier & Neustadt, L.L.P.

(57) ABSTRACT

A terminal device including a transmitter and circuitry. The circuitry is configured to detect a relay device accessible to the terminal device via a communication network, reproduce content, control the transmitter to transmit the content to the relay device via the communication network, generate a request for the relay device to send a query in accordance with the content to one or more of a plurality of servers, control the transmitter to transmit the request to the relay device via the communication network, and acquire a response to the request. The response is received via the communication network from the relay device and includes information from the one or more of the plurality of servers responsive to the query. The circuitry is configured to acquire, responsive to the acquired response, an application.

(Continued)

Further, the circuitry is configured to execute the application to display additional information corresponding to the content.

22 Claims, 11 Drawing Sheets

(51) Int. Cl.
| | | |
|---|---|---|
| *G11B 27/28* | (2006.01) | |
| *H04N 21/44* | (2011.01) | |
| *H04W 88/04* | (2009.01) | |
| *H04N 21/222* | (2011.01) | |
| *H04N 21/239* | (2011.01) | |
| *H04N 21/434* | (2011.01) | |
| *H04N 21/436* | (2011.01) | |
| *H04N 21/437* | (2011.01) | |
| *H04N 21/462* | (2011.01) | |
| *H04N 21/8352* | (2011.01) | |

(52) U.S. Cl.
CPC ....... *H04N 21/222* (2013.01); *H04N 21/2393* (2013.01); *H04N 21/437* (2013.01); *H04N 21/43615* (2013.01); *H04N 21/44008* (2013.01); *H04N 21/4622* (2013.01); *H04N 21/8352* (2013.01); *H04W 88/04* (2013.01); *G11B 27/28* (2013.01)

(56) References Cited

U.S. PATENT DOCUMENTS

| | | |
|---|---|---|
| 2007/0174624 A1* | 7/2007 | Wolosewicz ............ G06F 21/10 713/176 |
| 2011/0046755 A1 | 2/2011 | Sung et al. |
| 2011/0107364 A1 | 5/2011 | Lajoie et al. |
| 2011/0276157 A1 | 11/2011 | Wang et al. |
| 2012/0020647 A1 | 1/2012 | Vogel |

FOREIGN PATENT DOCUMENTS

| | | |
|---|---|---|
| JP | 2007-226286 | 9/2007 |
| JP | 2011-135477 | 7/2011 |
| JP | 2012-15980 | 1/2012 |

OTHER PUBLICATIONS

International Search Report dated Apr. 23, 2013 in PCT/JP2013/056946.

* cited by examiner

TERMINAL DEVICE, RELAY DEVICE, INFORMATION PROCESSING METHOD, PROGRAM, AND CONTENT IDENTIFICATION SYSTEM

CROSS-REFERENCE TO RELATED APPLICATIONS

This application is a continuation of U.S. Ser. No. 14/379,590 filed Aug. 19, 2014, the entire content of which is incorporated herein by reference, which is a national stage application of PCT/JP2013/056946, filed Mar. 13, 2013.

TECHNICAL FIELD

The present disclosure relates to a terminal device, a relay device, an information processing method, a program, and a content identification system, and to a terminal device, a relay device, an information processing method, a program, and a content identification system that enable, for example, arbitrary content being viewed by a user to be identified and an application program to be executed in linkage with progress of the content according to the identification result.

BACKGROUND ART

Presenting, to viewers, information relating to, for example, a TV program (hereinafter referred to simply as a program) being broadcast (performers, synopses, trailers of next episodes), information (news, weather forecasts, traffic information, and the like) is not directly related to a program, but useful for the viewers, and the like can be considered.

In order to realize the above, a command for acquiring and activating a dedicated application program (hereinafter referred to simply as an application) may be transmitted to a TV receiver set or the like in linkage with progress of the program. In reality, such presentation has already been realized in Japan and Europe by transmitting such a command or application using a bandwidth for data broadcasting of TV broadcasting signals (for example, refer to Patent Literature 1).

On the other hand, there is a technology called ACR (Automatic Content Recognition) for recognizing a kind of content when arbitrary content such as a video, or music is viewed or listened to.

Thus, in recent years, recognizing arbitrary content reproduced in a terminal device and then executing an application corresponding to the recognized content in accordance with progress of the content using the ACR technology has been discussed.

CITATION LIST

Patent Literature

Patent Literature 1: JP 2006-50237A

SUMMARY OF INVENTION

Technical Problem

In the ACR technology, however, content is identified by comparing signature data (a feature amount) extracted from arbitrary content being viewed to signature data of content that has already been registered in an ACR server.

Note that it is expected in the future that a plurality of business operators who provide ACR servers will emerge and a plurality of ACR servers will appear for clarification resulting from diversification of registered content and the like. Accordingly, it is thought that, as the ACR servers will be divided in terms of areas of recognition specialty, for example, an ACR server A specializing in recognition of movies, an ACR server B specializing in recognition of music videos, or an ACR server C specializing in recognition of animations, a terminal device will select and use the ACR servers.

FIG. 1 shows an example of a system configuration in which arbitrary content reproduced by a terminal device is recognized using a plurality of ACR servers.

The system is constituted by the terminal device 1, and the plurality of ACR servers 31A, 31B, and 31C to which the terminal device 1 is connected via the Internet 12.

The terminal device 1 has ACR clients 2A, 2B, and 2C mounted therein. The ACR clients 2A, 2B, and 2C are provided from the ACR servers 31A, 31B, and 31C respectively.

The ACR client 2A includes a protocol for using an independent service of the ACR server 31A, and extracts signature data from arbitrary content reproduced by the terminal device 1 using an extraction method suitable for the ACR server 31A and then transmits the signature data to the ACR server 31A. The ACR clients 2B and 2C are also operated in the same manner as the ACR client 2A.

The terminal device 1 has the three ACR clients 2A to 2C mounted therein, and thus can use the three ACR servers 31A to 31C. If there are three or more ACR servers 31 and the terminal device 1 intends to use all of them, ACR clients provided from the servers should of course be mounted in the terminal device 1.

When the number of ACR clients 2 to be mounted in the terminal device 1 increases each time the ACR servers 31 to be used increase, however, costs are required for the mounting and maintenance thereof. Thus, it is desired to be able to use a plurality of ACR servers 31 without increasing the number of ACR clients 2 mounted in the terminal device 1.

The present disclosure is conceived taking the above circumstances into consideration, and aims to be able to use a plurality of ACR servers without increasing the number of ACR clients mounted in a terminal device.

Solution to Problem

A terminal device according to a first aspect of the present disclosure includes a detection unit configured to detect a relay device, a reproduction unit configured to reproduce content, a transmission unit configured to transmit the reproduced content to the detected relay device, and an acquisition unit configured to acquire a response returned from one of identification server devices to the relay device according to a query, the response corresponding to an identification result of the content in such a way that the relay device extracts signature data representing a characteristic of the content from the content, generates the query including at least the extracted signature data, and transmits the generated query to the identification server device to request identification of the content.

The terminal device according to the first aspect of the present disclosure can further include an application execution unit configured to acquire and execute an application corresponding to the reproduced content based on the acquired response.

The terminal device according to the first aspect of the present disclosure can further include a generation unit configured to generate a general-purpose request for requesting the relay device for a use of the identification server devices. The transmission unit can also transmit the general-purpose request to the detected relay device.

The generation unit can generate the general-purpose request that includes information for designating an identification server device to be used from a plurality of the identification server devices that are useable by the relay device.

The acquisition unit can acquire data stored in a predetermined server obtained by the relay device converting the response returned from the identification server device into a predetermined data form based on information representing the predetermined server notified of by the relay device.

An information processing method according to the first aspect of the present disclosure is an information processing method of a terminal device, the information processing method performed by the terminal device, including a detection step of detecting a relay device, a reproduction step of reproducing content, a transmission step of transmitting the reproduced content to the detected relay device, and an acquisition step in which the relay device extracts signature data representing a characteristic of the content from the content, generate a query including at least the extracted signature data, transmits the generated query to one of identification server devices to request identification of the content, and acquires a response returned from the identification server device to the relay device according to the query, the response corresponding to an identification result of the content.

A program according to the first aspect of the present disclosure caused a computer to function as a detection unit configured to detect a relay device, a reproduction unit configured to reproduce content, a transmission unit configured to transmit the reproduced content to the detected relay device, and an acquisition unit configured to acquire a response returned from one of identification server devices to the relay device according to a query, the response corresponding to an identification result of the content in such a way that the relay device extracts signature data representing a characteristic of the content from the content, generates the query including at least the exacted signature data, and transmits the generated query to the identification server device to request identification of the content.

According to the first aspect of the present disclosure, the relay device is detected, the content is reproduced, and the reproduced content is transmitted to the detected relay device. A response returned from one of identification server devices to the relay device according to a query is acquired, the response corresponding to an identification result of the content in such a way that the relay device extracts signature data representing a characteristic of the content from the content, generates the query including at least the extracted signature data, and transmits the generated query to the identification server device to request identification of the content.

A relay device according to a second aspect of the present disclosure includes, in a terminal device in which one or more identification clients are mounted, each of which corresponds to usable identification server devices, an extraction unit configured to extract signature data representing a characteristic of content from the content reproduced by a terminal device, a generation unit configured to generate a query for requesting identification of the content from one of the identification server devices, the query including at least the extracted signature data, a communication unit configured to transmit the generated query to the corresponding identification server device and to receive a response returned from the identification server device according to the query, the response corresponding to an identification result of the content, and a relay unit configured to relay the response returned from the identification server device to the terminal device.

A number of the identification clients corresponding to a number of the plurality of usable identification server devices can be mounted.

The relay device according to the second aspect of the present disclosure can further include a notification unit configured to notify the terminal device of information representing the plurality of usable identification server devices.

The relay unit can convert the response into a data form suitable for the terminal device and stores the response a predetermined server, and notify the terminal device of information representing the predetermined server.

An information processing method according to the second aspect of the present disclosure is an information processing method of a relay device in which one or more identification clients are mounted, each of which corresponds to usable identification server devices, the information processing method performed by the identification clients, including an extraction step of extracting signature data representing a characteristic of content from the content reproduced by a terminal device, a generation step of generating a query for requesting identification of the content from the identification server device, the query including at least the extracted signature data, a communication step of transmitting the generated query to the corresponding identification server device and receiving a response returned from the identification server device according to the query, the response corresponding to an identification result of the consent, and a relay step of relaying the response returned from the identification server device to the terminal device.

A program according to the second aspect of the present disclosure causes a computer to function as an extraction unit configured to extract signature data representing a characteristic of content from the content reproduced by a terminal device, a generation unit configured to generate a query for requesting identification of the content from one of the identification server devices, the query including at least the extracted signature data, a communication unit configured to transmit the generated query to the corresponding identification server device and to receive a response returned from the identification server device according to the query, the response corresponding to an identification result of the content, and a relay unit configured to relay the response returned from the identification server device to the terminal device.

According to the second aspect of the present disclosure, a recognition client extracts signature data representing a characteristic of content from the content reproduced by a terminal device, generates a query for requesting identification of the content from the identification server device, the query including at least the extracted signature data, transmit the generated query to the identification server device, and relays a response returned from the identification server device according to the query, the response corresponding to an identification result of the content, to the terminal device.

A content identification system according to a third aspect of the present disclosure is a content identification system including a terminal device, a relay device, and identification server devices. The terminal device includes a detection unit configured to detect the relay device, a reproduction unit configured to reproduce content, a transmission unit configured to transmit the reproduced content to the detected relay device, and an acquisition unit configured to acquire a response returned from one of the identification server devices to the relay device according to a query, the response corresponding to an identification result of the content in such a way that the relay device extracts signature data representing a characteristic of the content from the content, generates the query including at least the extracted signature data, and transmits the generated query to the identification server device to request identification of the content. The relay device has one or more identification clients mounted therein, each of which corresponds to the usable identification server devices, and each of the identification client includes an extraction unit configured to extract signature data representing a characteristic of the content from the content reproduced by the terminal device, a generation unit configured to generate a query for requesting identification of the content from the identification server device, the query including at least the extracted signature data, a communication unit configured to transmit the generated query to the corresponding identification server device and to receive the response returned from the identification server device according to the query, the response corresponding to an identification result of the content, and a relay unit configured to relay the response returned from the identification server device to the terminal device. The server device includes a database configured to represent a correspondence relationship between the signature data representing the characteristic of the content extracted from the content and a content identifier representing the content as an extraction source, a response generation unit configured to identify the content as the extraction source of the signature data included in the query transmitted from the terminal device with reference to the database and to generate the response corresponding to an identification result, and a transmission unit configured to transmit the generated response to the relay device.

According to the third aspect of the present disclosure, the terminal device detects the relay device, reproduces content, and transmits the reproduced content to the detected relay device. In addition, by the recognition clients of the relay device, the signature data representing the characteristic of the content is extracted from the content reproduced by the terminal device, the query for requesting identification of the content from the identification server device and including at least the extracted signature data is generated and transmitted to the identification server device, and the response returned from the identification server device according to the query, the response corresponding to the identification result of the content is relayed to the terminal device.

Advantageous Effects of Invention

According to the first aspect of the present disclosure, the plurality of identification server devices can be used via the relay device.

According to the second aspect of the present disclosure, the plurality of identification server devices can be used instead of the terminal device.

According to the third aspect of the present disclosure, the terminal device can use the plurality of identification server devices via the relay device.

DESCRIPTION OF EMBODIMENTS

Hereinafter, an exemplary embodiment for implementing the present disclosure (hereinafter referred to as an embodiment) will be described in detail with reference to drawings.

[Configuration Example of Content Identification System]

Figure 1:
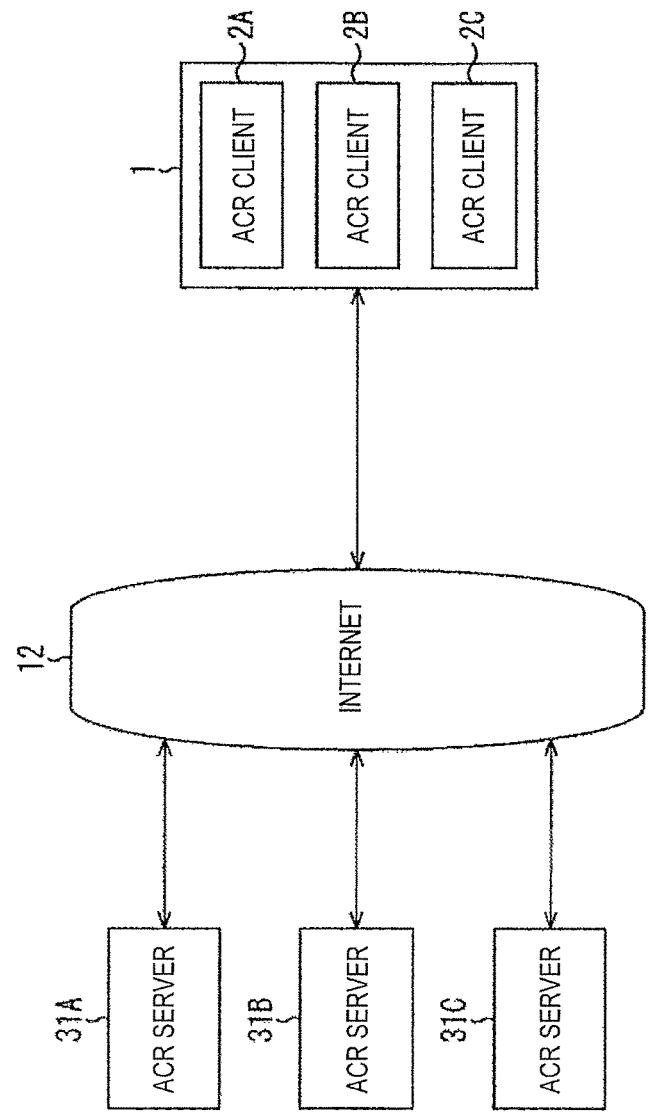
FIG. 1 is a block diagram showing an example of a system configuration considered for use of a plurality of ACR servers.
Figure 2:
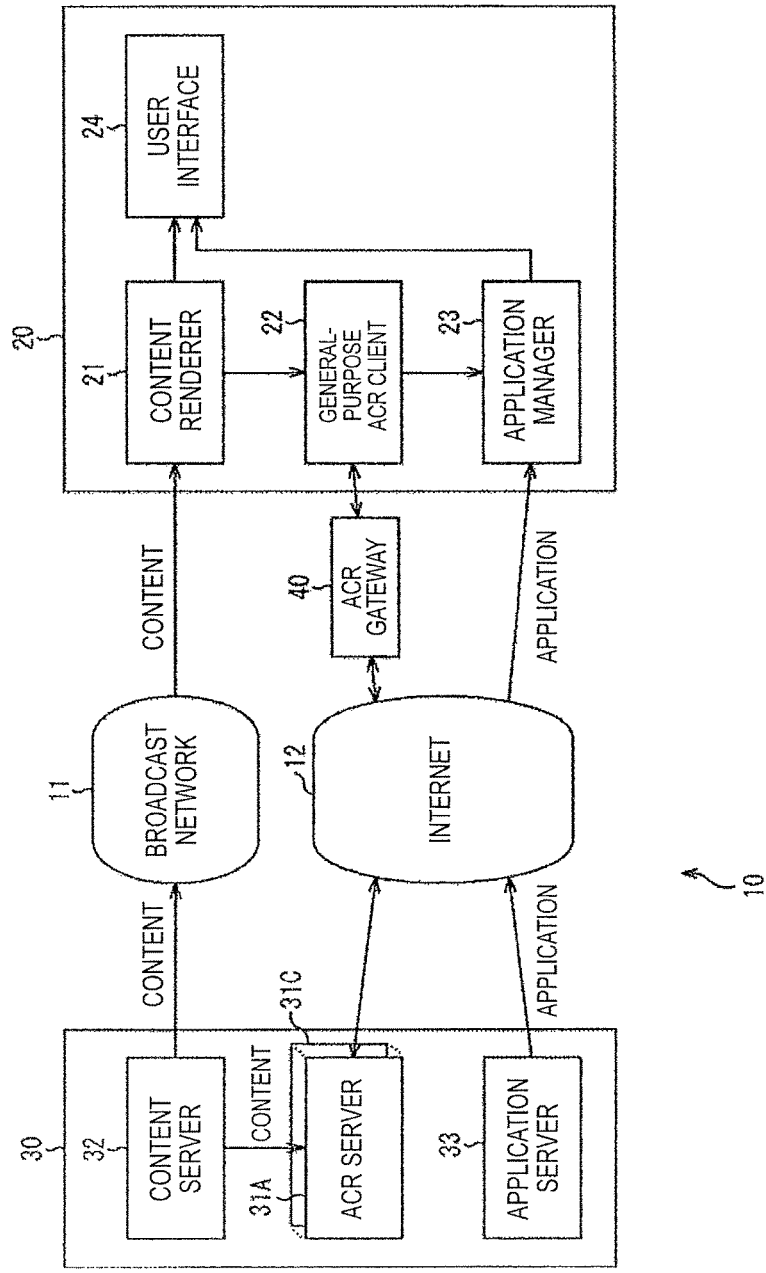
FIG. 2 is a block diagram showing a configuration example of a content identification system.

FIG. 2 shows a configuration example of a content identification system 10 that is an embodiment of the content identification system of the present disclosure.

The content identification system 10 identifies what arbitrary content reproduced by a terminal device 20 is, and causes the terminal device 20 to execute an application corresponding to the identified content in linkage with progress of the content.

As the application is executed in linkage with the progress of the content, information relating to the content being viewed by a user (a performer, a synopsis, a trailer of the next episode, and the like), information (news, weather forecasts, traffic information, and the like) that is not directly related to the content, but useful for a user can be displayed on a screen together with the content, or a quiz, a poll, and the like in which viewers can take part can be realized.

Note that the content of the present embodiment is not limited to a TV program broadcast via a TV broadcasting network, CATV network, IPTV network, or the like, and refers to every kind of AV content, for example, content recorded by a recorder and reproduced, content from a package medium by a player, content distributed or downloaded via the Internet, and the like.

The content identification system 10 is constituted by the terminal device 20, a supply device 30, and an ACR gateway 40.

[Description of the Terminal Device 20]

The terminal device 20 that is an embodiment of the terminal device of the present disclosure is set to be installed in a content reproduction device such as a TV receiver set, a personal computer, a tablet-type computer, or a smartphone.

The terminal device 20 can acquire and reproduce content supplied from a broadcast network 11 such as a TV broadcasting network, a CATV network, or an IPTV network, an external device, or the like. In addition, the terminal device 20 can access an application server 33 of the supply device 30 via the Internet 12. Furthermore, the terminal device 20 can connect to the ACR gateway 40.

The terminal device 20 has a content renderer 21, a general-purpose ACR client 22, an application manager 23, and a user interface 24.

The content renderer 21 has a function of acquiring and reproducing content. In addition, the content renderer 21 branches all content displayed on a display of a content reproduction device such as a TV receiver set in which the terminal device 20 is installed and supplies it to the general-purpose ACR client 22. In other words, content (a program) received by a tuner of the content reproduction device in which the terminal device 20 is installed as well as content input from an external device to various input terminals (HDMI terminal and the like) of the content reproduction device is branched and supplied to the general-purpose ACR client 22.

The general-purpose ACR client 22 detects the ACR gateway 40 that the terminal device 20 can access and connects thereto, transmits content input by the content renderer 21 to the ACR gateway 40, and gives a notification of a general-purpose request for instructing identification of the content using the ACR servers 31.

In addition, the general-purpose ACR client 22 accesses a URL (Uniform Resource Locator) notified of the ACR gateway 40, thereby acquires an identification result of the instructed content, and then analyzes the acquired identification result. Furthermore, the general-purpose ACR client 22 causes the application manager 23 to acquire an application corresponding so the contest being reproduced based on the analysis result and to execute the program in linkage with progress of the content.

The application manager 23 acquires the application corresponding to the content being reproduced from the application server 33 via the Internet 12 and executes the application under control of the general-purpose ACR client 22. In addition, the application manager 23 acquires relevant metadata used by the application being executed from the application server 33.

The user interface 21 causes various kinds of information displayed by the application being executed in linkage with the progress of the content to be displayed on a display of the TV receiver set, or the like. In addition, the user interlace 24 accepts manipulation of the user over the application being executed.

[Description of the Supply Device 30]

The supply device 30 is constituted by a plurality of ACR servers 31, a content server 32, and the application server 33. In the present embodiment, the plurality of ACR servers 31 are set to be ACR servers 31A, 31B, and 31C.

The ACR server 31A acquires and registers various kinds of content that can be viewed on the terminal device 20 side. To be specific, signature data representing a feature amount of content is extracted, and ACR reference data obtained by associating the extracted signature data with a content identifier, an application identifier, and the like is generated in advanced and made into a database.

Note that, for the extraction method of the signature data, an existing arbitrary method can be applied. For example, a watermark that has already been enclosed in content may be extracted to be signature data, or a fingerprint may be computed to be set as signature data.

By using the fingerprint as signature data, even when resolution, an aspect ratio, a bit rate, an encoding format or the like of content is converted, the same signature data can be obtained before and after the conversion. Thus, recognition accuracy when content is recognized based on the signature data can be enhanced.

In addition, the ACR server 31A identifies content according to an ACR query transmitted from an ACR client 41A (FIG. 3) of the ACR gateway 40, generates an ACR response as the identification result, and returns the ACR response to the ACR client 41A via the Internet 12.

The same operation as of the ACR server 31A is also applied to the ACR servers 31B and 31C. It is, however, not necessary for the ACR servers 31A to 31C to integrate their extraction methods of signature data, and their extraction methods may differ from each other. In addition, different content may be registered in each of the ACR servers 31A to 31C, or the same content may be registered in the ACR servers 31A to 31C in an overlapping manner. Hereinafter, the ACR servers 31A to 31C will be referred to simply as ACR servers 31 unless it is necessary to distinguish the servers from one another.

The content server 32 distributes content via the broadcast network 11, and supplies the distributed content to the ACR servers 31.

The application server 33 supplies an application via the Internet 12 according to a request from the application manager 23 of the terminal device 20.

Note that the ACR servers 31, the content server 32, and the application serve 33 constituting the supply device 30 may be disposed in one place in a centralized manner, or may be disposed in a decentralized manner. In addition, the ACR servers 31, the content server 32, and the application server 33 may be configured to be appropriately combined.

[Description of the ACR Gateway 40]

Figure 3:
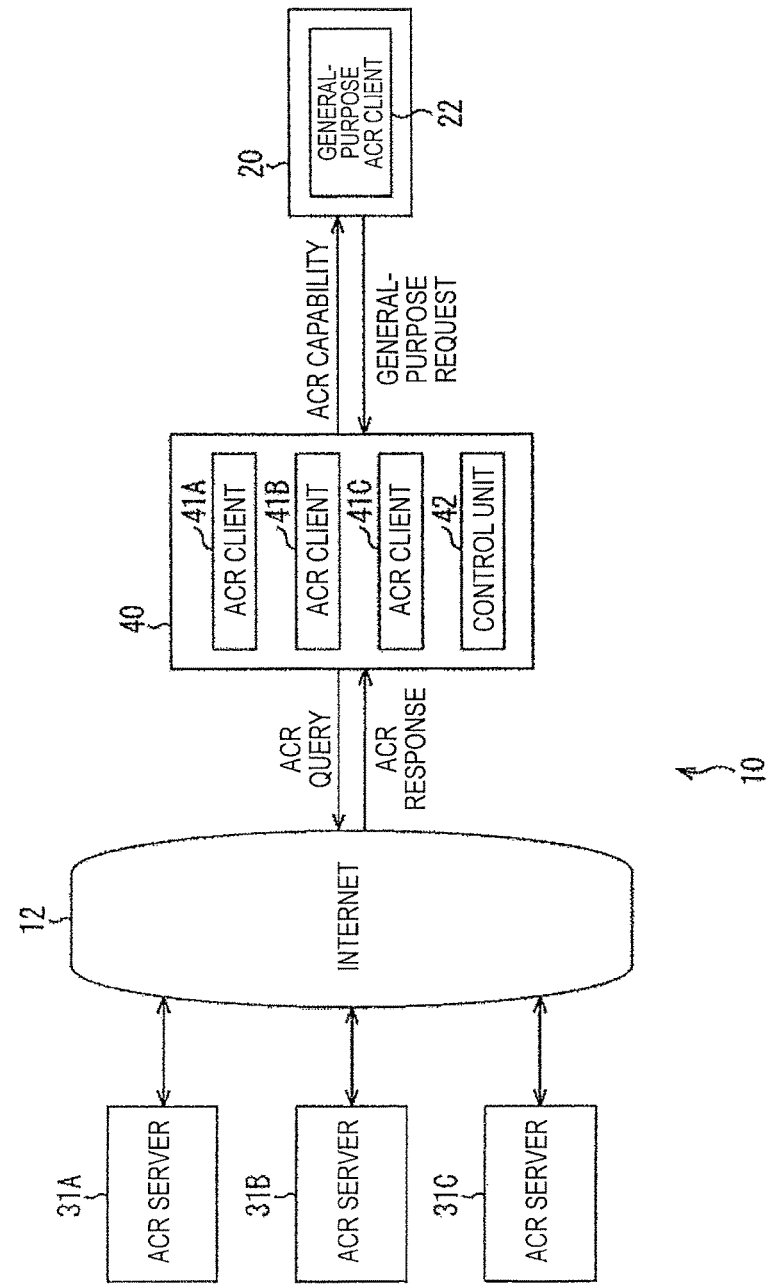
FIG. 3 is a block diagram illustrated by extracting main parts of the content identification system.

FIG. 3 shows a configuration example of parts relating to ACR of the configuration of the content identification system 10.

The ACR gateway 40 that is an embodiment of the relay device of the present disclosure has ACR clients 41A, 41B, and 41C, and a control unit 42.

The ACR clients 41A to 41C are supplied respectively from the ACR servers 31A to 31C and mounted in the ACR gateway 40. In this case, the ACR gateway 40 can use the three ACR servers 31A to 31C.

The ACR client 41A includes a protocol for using an independent service of the ACR server 31A, extracts signature data using an extraction method suitable for the ACR server 31A from content transmitted from the general-purpose ACR client 22, and transmits the signature data to the ACR server 31A via the Internet 12.

Since the ACR clients 41B and 41C perform the same operation as the ACR client 41A, description thereof will be omitted. Hereinbelow, the ACR clients 41A to 41C will be referred to simply as the ACR clients 41 unless it is necessary to distinguish the clients from one another.

The control unit 42 notifies the general-purpose ACR client 22 of ACR capability that represents the function of the ACR gateway 40.

Note that, when content is transmitted from the general-purpose client 22 to the ACR gateway 40, the content is in the state of RAW data of which compression coding or encryption is cancelled. Thus, in order to prevent illegitimate outflow of the RAW data of the content, the ACR gateway 40 is set to be included in a home server or the like to which the content can be transmitted from the terminal device 20 in security on a LAN (Local Area Network) such as a home network to which the TV receiver set that includes the terminal device 20 belongs. The ACR gateway 40, however, may be provided on the Internet 12 if a communication line on which the RAW data of the content from the terminal device 20 can be securely transmitted is secured.

In addition, according to a state of security of the communication line between the terminal device 20 and the ACR gateway 40, the content may be set to be transmitted to the ACR gateway 40 after being subjected to compression coding or encryption.

[Description of the General-Purpose ACR Client 22]

Figure 4:
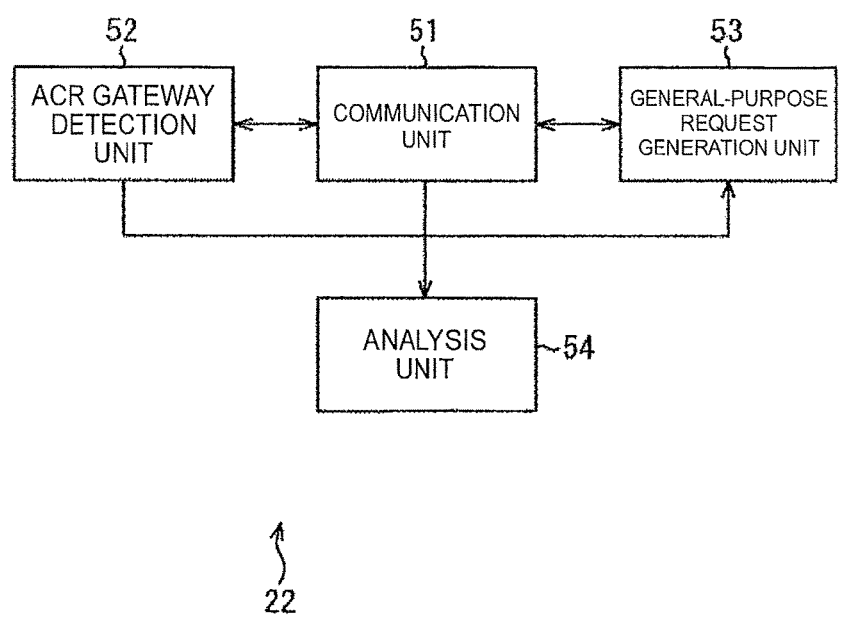
FIG. 4 is a block diagram showing a detailed configuration example of a general-purpose ACR client.

Next, FIG. 4 shows a detailed configuration example of the general-purpose ACR client 22 of the terminal device 20.

The general-purpose ACR client 22 has communication unit 51, an ACR gateway detection unit 52, a general-purpose request generation unit 33, and an analysis unit 54.

The communication unit 51 executes communication of various kinds of data between the general-purpose ACR client 22 and the ACR gateway 40. To be specific, the communication unit transmits general-purpose requests and RAW data of content from the general-purpose ACR client 22 to the ACR gateway 40. In addition, the communication unit recesses the ACR capability from the ACR gateway 40. Furthermore, the communication unit receives a URL at which an identification result of the content that the ACR gateway 40 acquires front the ACR servers 31 can be referred to. Furthermore, the communication unit 51 accesses a predetermined server that retains the identification result of the content according to control of the analysis unit 54.

The ACR gateway detection unit 52 detects, through the communication unit 51, the ACR gateway 40 and acquires the ACR capability that represents the function thereof. For the detection of the ACR gateway 40 and acquisition of the ACR capability by the ACR gateway detection unit 52, for example, an SSDP (Simple Discovery Protocol) of UPnP (Universal Plug and Play) can be used.

In the ACR capability, an ACR server identifier representing an ACR server 31 that can be used by the ACR gateway 40, and a general-purpose protocol representing a data form of the content transmitted from the general-purpose ACR client 22 to the ACR gateway 40 are described. Note that, for the general-purpose protocol, one kind thereof is generally set, but a plurality of kinds may be set. It is desirable, however, that the number of protocols be small. Details of the ACR capability will be described later with reference to FIG. 7.

The general-purpose request generation unit 53 generates a general-purpose request that includes information for designating one to be used among the ACR servers 31 that the ACR gateway 40 can use and outputs the general-purpose request to the communication unit 51. In addition, the general-purpose request generation unit 53 transmits the RAW data of the content input from the content renderer 21 to the communication unit 51 in a state in which the RAW data is associated with the ACR capability.

The analysis unit 54 accesses the URL that the ACR gateway 40 notifies of via the communication unit 51, thereby acquiring and analyzing relevant metadata that has been converted into an HTML document stored therein. Then, based on the analysis result, the application manager 23 is caused to acquire an application corresponding to the content being reproduced and to execute the application in linkage with progress of the content.

[Detailed Configuration Example of an ACR Client 41]

Figure 5:
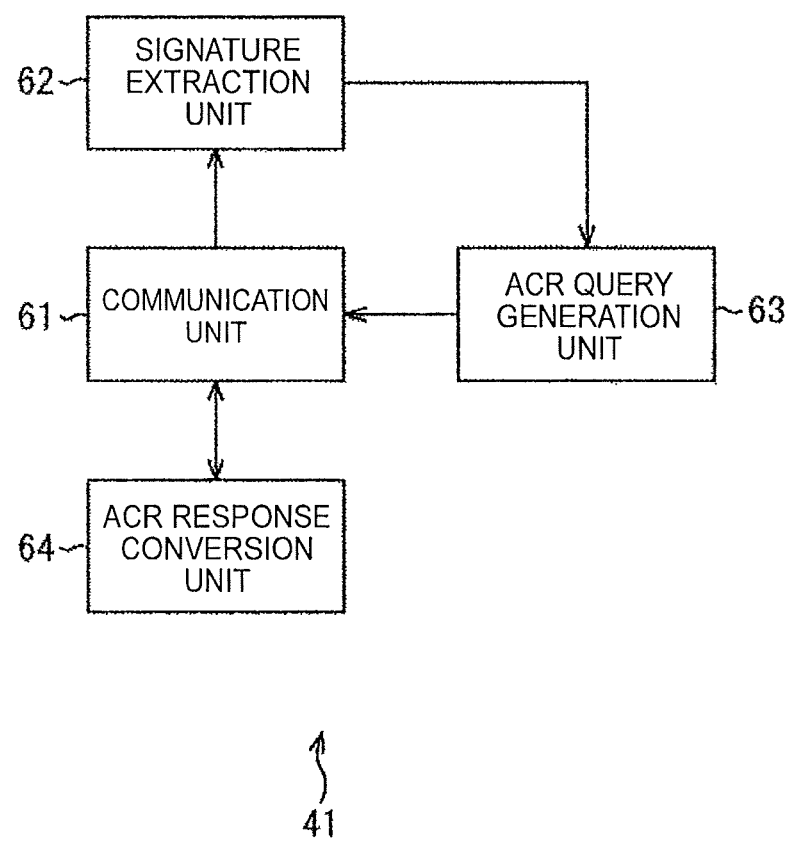
FIG. 5 is a block diagram showing a detailed configuration example of an ACR client.

Next, FIG. 5 shows a detailed configuration example of each ACR client 41 mounted in the ACR gateway 40.

The ACR client 41 is constituted by a communication unit 61, a signature extraction unit 62, an ACR query generation unit 63, and an ACR response conversion unit 64.

The communication unit 61 receives the (RAW data of) content transmuted from the general-purpose ACR client 22 and outputs the data to the signature extraction unit 62. In addition, the communication unit 61 transmits the ACR query generated by the ACR query generation unit 63 to the corresponding ACR server 31 via the Internet 12, and outputs an ACR response thereto from the ACR server 31 to the ACR response conversion unit 64.

The signature extraction unit 62 extracts signature data representing a characteristic of the foment from the consent transmitted from the general-purpose ACR client 22 using the same extraction method as that of the corresponding ACR server 31, and outputs the data to the ACR query generation unit 63.

The ACR query generation unit 63 generates an ACR query that includes the signature data each time the signature data is input from the signature extraction unit 62. A data structure of the ACR query will be described later with reference to FIG. 8.

The ACR response conversion unit 64 analyzes the ACR response from the ACR server 31A, converts relevant metadata or the like included therein into an HTML document (a client-side script such as JavaScript (registered trademark)), and then stores the document in a predetermined server. Furthermore, the ACR response conversion unit 64 notifies the general-purpose ACR client 22 of the URL representing the predetermined server in which the HTML document is stored using the communication unit 61. Note that, for the predetermined server, one on the LAN to which the terminal device 20 belongs may be used as the ACR gateway 40 or one on the Internet 12 may be used.

[Configuration Example of the ACR Server 31]

Figure 6:
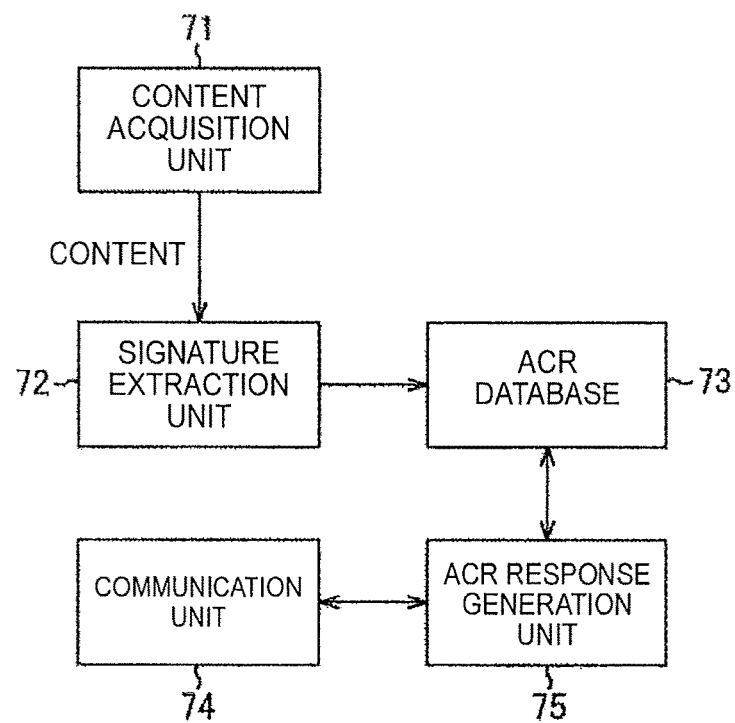
FIG. 6 is a block diagram showing a configuration example of an ACR server.

FIG. 6 shows a detailed configuration example of the ACR server 31 constituting the supply device 30. Note that the ACR server 31A is assumed to communicate with the ACR client 41A via the Internet 12. The same applies to the ACR servers 31B and 31C.

The ACR server 31 is constituted by a content acquisition unit 71, a signature extraction unit 72, an ACR database 73, a communication unit 74, and an ACR response generation unit 75.

The content acquisition unit 71 acquires various kinds of content that can be viewed on the terminal device 20 side and metadata thereof from the content server 32 or the like, and supplies the acquired content to the signature extraction unit 72.

The signature extraction unit 72 extracts signature data representing a characteristic of the content from the content supplied from the content acquisition unit 71 using a predetermined extraction method in a predetermined sampling cycle, and outputs the data to the ACR database 73.

The ACR database 73 generates ACR reference data by associating a consent identifier indicating content of the extraction source, a content reproduction time indicating an extraction timing of the signature data and relevant metadata relating to the content (including an application identifier indicating an application executed in a linked manner) with each piece of signature data input from the signature extraction unit 72 and retains the ACR reference data. Note that the ACR reference data generated in advance may be supplied from outside to the ACR database 73 and retained therein. A data structure of the ACR reference data will be described later with reference to FIG. 9.

The communication unit 74 receives, via the Internet 12, the ACR query transmitted from a corresponding ACR client among the ACR clients 41 mounted in the ACR gateway 40 and outputs the ACR query to the ACR response generation unit 75. In addition, the communication unit 74 transmits the ACR response generated by the ACR response generation unit 75 to the corresponding ACR client among the ACR clients 41 mounted in the ACR gateway 40 via the Internet 12.

With reference to the ACR reference data of the ACR database 73, the ACR response generation unit 75 identifies content that is the extraction source of the signature data included in the ACR query transmitted from the corresponding ACR client among the ACR clients 41 mounted in the ACR gateway 40. Furthermore, the ACR response generation unit 75 generates an ACR response that includes the identification result and outputs it to the notification unit 74. A data structure of the ACR response will be described later with reference to FIG. 10.

[Data Structure of the ACR Capability]

Figure 7:
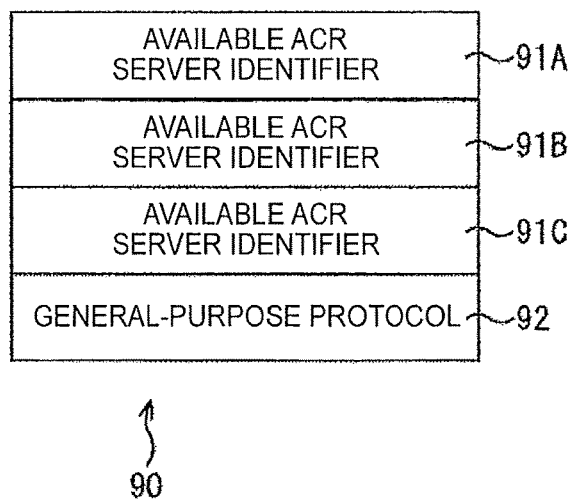
FIG. 7 is a diagram showing a data structure of ACR capability.

Next, FIG. 7 shows a data structure of the ACR capability of which the ACR gateway 40 notifies the general-purpose ACR client 22.

In the ACR capability 90, available server identifiers 91 indicating the ACR servers 31 that the ACR gateway 40 can use are described. In this case, since the ACR gateway 40 has the ACR clients 41A to 41C mounted therein and can use the ACR servers 31A to 31C, in the ACR capability 90, available server identifiers 91A, 91B, and 91C each indicating the three ACR servers 31A to 31C are described.

Furthermore, in the ACR capability 90, a general-purpose protocol 92 representing a data form of the content transmitted from the general-purpose ACR client 22 to the ACR gateway 40 is described. The general-purpose protocol 92 includes, for example, the size of a data block (frame), an acquisition cycle (frame rate), intra-frame region designation information, and auxiliary information to be transmitted with a data block (a local time stamp, a block size, a block extraction cycle, and the like).

[Data Structure of the ACR Query]

Figure 8:
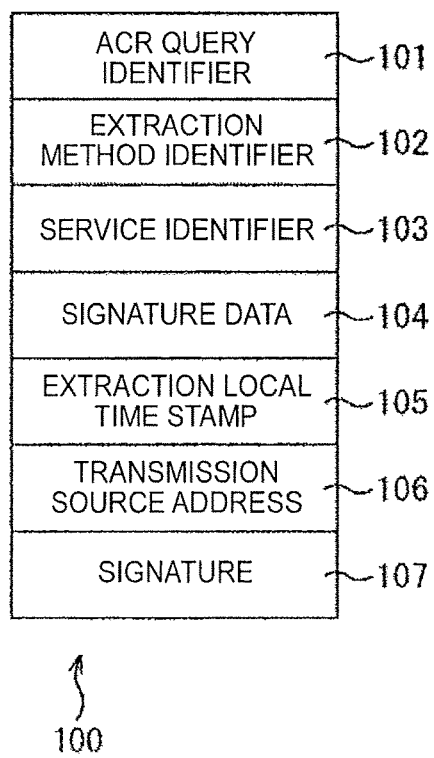
FIG. 8 is a diagram showing a data structure of an ACR query.

FIG. 8 shows a data structure of the ACR query generated by the ACR query generation unit 63 of the ACR client 41.

The ACR query 100 includes an ACR query identifier 101, an extraction method identifier 102, a service identifier 103, signature data 104, an extraction local time stamp 105, a transmission source address 106, and a signature 107.

The ACR query identifier 101 is information for specifying the ACR query 100. The extraction method identifier 102 is information for specifying the extraction method used when the signature data 104 is extracted. The service identifier 103 is information for selecting an ACR server 31 or an ACR service for processing the ACR query 100 when there are the plurality of ACR servers 31 that identify content based on the signature data 104 or one ACR server 31 provides a plurality of ACR services.

The signature data 104 is extracted from the content by the signature extraction unit 62. The extraction local time stamp 105 indicates a timing at which the signature data 104 is extracted from the content by the signature extraction unit 62.

The transmission source address 106 is an address of the ACR gateway 40 that transmits the ACR query 100 on the Internet 12, and is used as a return destination of the ACR response generated by the ACR server 31 according to the ACR query 100. The signature 107 for preventing tampering with the ACR query 100 on a communication line such as the Internet 12. Note that such tampering may be prevented by encrypting the entire ACR query 100 for transmission.

[Data Structure of the ACR Reference Data]

Figure 9:
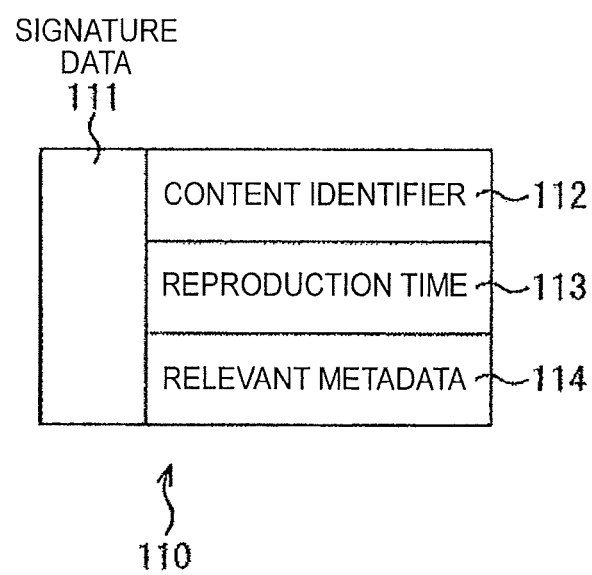
FIG. 9 is a diagram showing a data structure of ACR reference data.

FIG. 9 shows a data structure of the ACR reference data retained by the ACR database 73 of the ACR server 31.

The ACR reference data 110 is constituted by signature data 111 associated with content identifier 112, a reproduction time 113, and relevant metadata 114.

The signature data 111 is extracted from content by the signature extraction unit 72. The content identifier 112 represents content as an extraction source of the signature data 111. The reproduction time 113 represents a progress timing of content when the signature data 111 is extracted from the content represented by the content identifier 112, and is indicated by, for example, an elapsed time from the head of the content represented by the content identifier 112.

The relevant metadata 114 is metadata relating to the content represented by the content identifier 112, and includes an application identifier representing an application (including information representing an acquisition destination of the application) to be executed in linkage with the progress timing represented by the reproduction time 113 of the content.

[Data Structure of the ACR Response]

Figure 10:
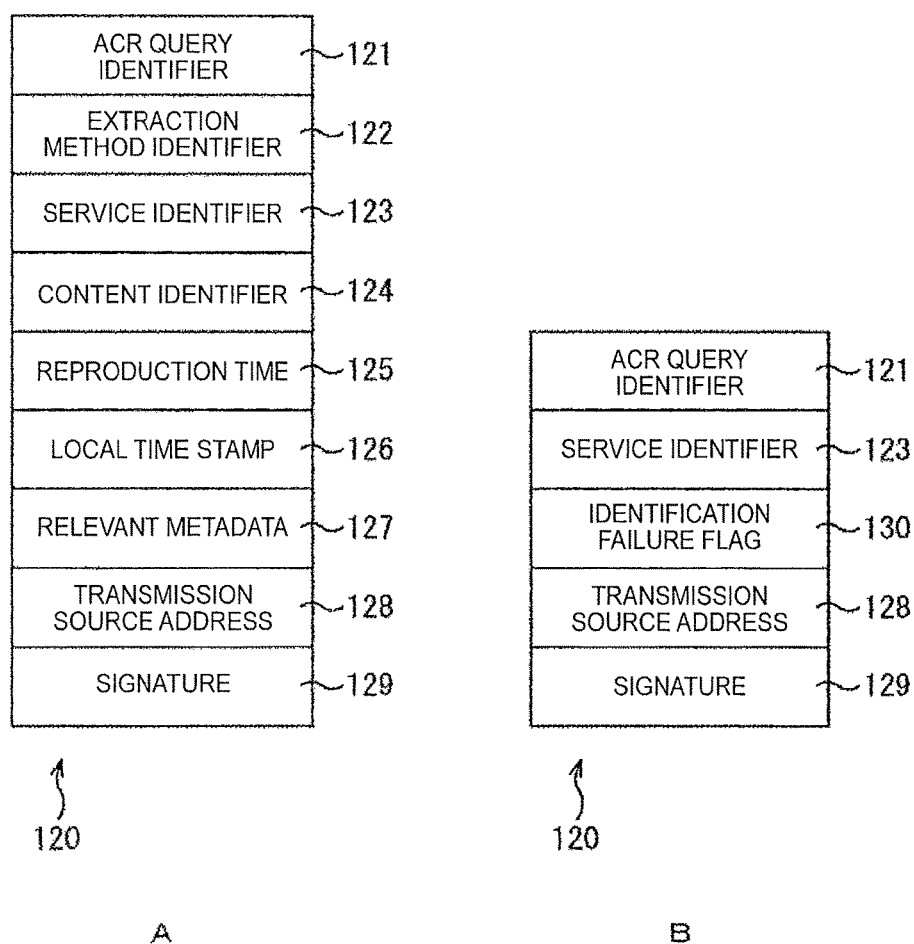
FIG. 10 is a diagram showing a data structure of an ACR response.

FIG. 10 shows a data structure of the ACR response generated by the ACR response generation unit 75 of the ACR server 31.

Note that A of the drawing is of a data structure of the ACR response generated when the signature data 104 of the ACR query 100 transmitted from the ACR client 41 of the ACR gateway 40 and the signature data 111 of the ACR reference data 110 that has already been registered in the ACR database 73 can be identified, in other words, when content being viewed can be identified by the terminal device 20. B of the drawing is of a data structure of the ACR response generated when identification of content fails.

As shown in A of the drawing, the ACR response 120 generated when content can be identified includes an ACR query identifier 121, an extraction method identifier 122, a service identifier 123, a content identifier 124, a reproduction time 125, a local time stamp 126, relevant metadata 127, a transmission source address 128, and a signature 129.

As shown in B of the drawing, the ACR response 120 generated a when identification of content fails includes the ACR query identifier 121, the service identifier 123, the transmission source address 128, the signature 129, and an identification failure flag 130.

For the ACR query identifier 121, the extraction method identifier 122, the service identifier 123, and the local time stamp 126, the ACR query identifier 101, the extraction method identifier 102, the service identifier 103, and the extraction local time stamp 105 of the ACR query 100 that triggers generation of the ACR response 120 are diverted.

For the content identifier 124, the reproduction time 125, and the relevant metadata 127, the content identifier 112, the reproduction time 113, and the relevant metadata 114 of the ACR reference data 110 that includes the identified signature data 111 are diverted.

The transmission source address 128 is the address of the ACR servers 31A to 31C that transmit the ACR response 120 on the Internet 12. The signature 129 is for presenting tampering with the ACR response 120 on the communication line. Note that such tampering may be prevented by encrypting the entire ACR response 120 for transmission.

The identification failure flag 130 represents failure of the ACR server 31 of identification of the signature data 104 included in the ACR query 100 and the signature data 111 of the ACR reference data 110 that has already been registered in the ACR database 73, in other words, represents that the terminal device 20 has failed identification of the content being viewed.

[Operation by the Content Identification System 10]

Figure 11:
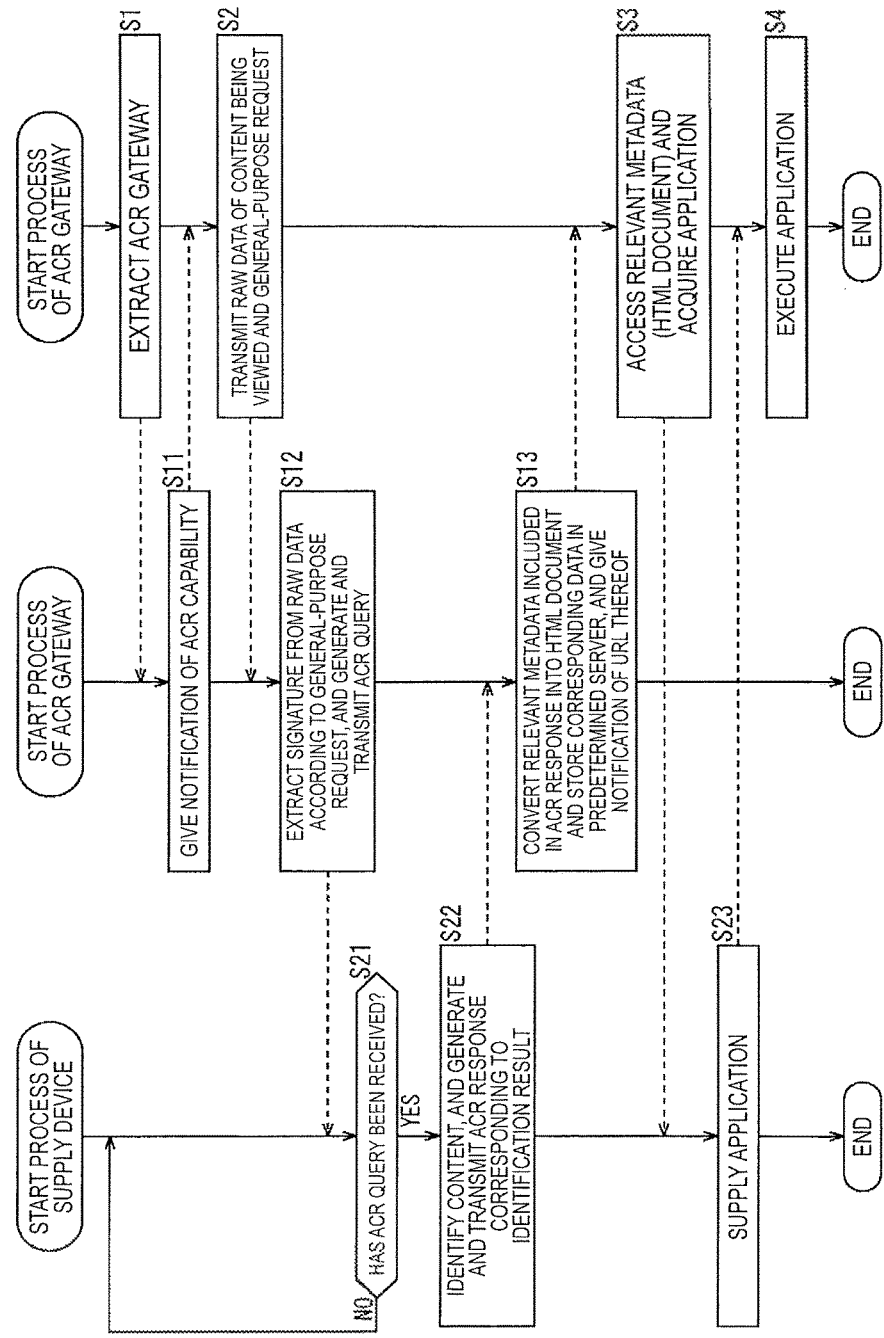
FIG. 11 is a flowchart describing an operation of the content identification system.

Next, an operation of the content identification system 10 will be described. FIG. 11 is a flowchart describing the operation of the content identification system 10.

Note that, as a premise, it is assumed that content that can be viewed by the terminal device 20 has already been registered in each ACR server 31 constituting the supply device 30, in other words, that the ACR reference data 110 that has already been generated is retained in the ACR database 73 of the ACR server 31.

In Step S1, the ACR gateway detection unit 52 constituting the general-purpose ACR client 22 of the terminal device 20 detects the ACR gateway 40 via the communication unit 51. In Step S11, the control unit 42 of the detected ACR gateway notifies the general-purpose ACR client 22 of the ACR capability 90 indicating the function of the ACR gateway 40.

When content is reproduced by the TV receiver set in which the terminal device 20 is included, in other words, a user views the content from the TV receiver set, the content renderer 21 of the terminal device 20 branches the content being viewed and outputs the content to the general-purpose ACR client 22 in Step S2. In the general-purpose ACR client 22, the general-purpose request generation unit 53 generates a general-purpose request. In addition, the general-purpose request generation unit 53 extracts RAW data from the content being viewed according to the general-purpose protocol 92 of the ACR capability 90. Then, the communication unit 51 transmits the RAW data of the content being viewed and the general-purpose request to the ACR gateway 40.

According to the general-purpose request, the ACR gateway 40 generates the ACR query and then transmits the ACR query to the ACR server 31 in Step S12. To be specific, the signature extraction unit 62 extracts the signature data 104 from the RAW data of the content of which the general-purpose ACR client 22 informed using an extraction method suitable for the ACR server 31 to be used, and outputs the signature data to the ACR query generation unit 63. Then, the ACR query generation unit 63 generates the ACR query 100 that includes the extracted signature data 104, and then the communication unit 43 transmits the generated ACR query 100 to the ACR server 31 to be used via the Internet 12.

On the other band, the ACR server 31 of the supply device 30 stands by until the ACR query 100 transmitted from the ACR client 41 of the ACR gateway 40 is received by the communication unit 74 in Step S21. When the ACR query 100 is received by the communication unit 74, the process proceeds to Step S22.

In Step S22, the ACR response generation unit 75 identifies the content that is the extraction source of the signature data 104 by comparing the signature data 111 of the ACR reference data 110 registered in the ACR database 73 and the signature data 104 included in the received ACR query 100. Then, the ACR response generation unit 75 generates the ACR response 120 according to the identification result of the content. In other words, when the content as the extraction source of the signature data 104 can be identified, the ACR response 120 shown in A of FIG. 10 is generated, and when the identification fails, the ACR response 120 shown in B of FIG. 10 is generated. The generated ACR response 120 is output to the communication unit 74 from the ACR response generation unit 75. The communication unit 74 transmits the generated ACR response 120 to the ACR gateway 40 via the Internet 12.

When the ACR response 120 is received by the ACR client 41 of the ACR gateway 40, the ACR response conversion unit 64 of the ACR gateway 40 analyzes the ACR response 120 and converts the relevant metadata 127 included therein or the like into an HTML document that the terminal device 20 side can access and stores the relevant metadata in a predetermined server in Step S13. Furthermore, the ACR response conversion unit 64 notifies the general-purpose ACR client 22 of the URL representing the predetermined server in which the HTML document is stored using the communication unit 61.

The analysis unit 54 of the general-purpose ACR client 22 that has received the notification of the URL accesses the URL of which the ACR gateway 40 has notified via the communication unit 51 in Step S3, and then the relevant metadata 127 that has been converted into the HTML document stored therein is acquired and analyzed. Then, based on the analysis result, the application manager 23 is notified of an application identifier corresponding to the content being reproduced. When the application manager 23 accesses the application server 33 based on the application identifier, the application server 33 supplies the application according to a request from the application manager 23 in Step S23. In Step S4, the application manager 23 executes the acquired application in linkage with progress of the content.

Note that the processes of the steps described above are repeatedly executed while the content is viewed on the terminal device 20. Accordingly, an operation of the application in linkage with the progress of the content being viewed is possible.

In addition, according to a linked application, for example, information relating to content is displayed, a quiz or a poll in which viewers or listeners can take part is realized, or other content is recommended or downloaded.

As described above, by providing the plurality of ACR clients 41 respectively corresponding to the plurality of ACR servers 31 in the ACR gateway 40, the terminal device 20 can use the plurality of ACR servers 31 only by having the general-purpose ACR client 22.

The terminal device 20, the supply device and the ACR gateway 40 that execute the series of processes described above can be respectively configured by hardware and realized as a computer executes software. The computer included a computer incorporated into dedicated hardware, for example, a general-purpose personal computer that can execute various functions with various programs installed therein, or the like.

Figure 12:
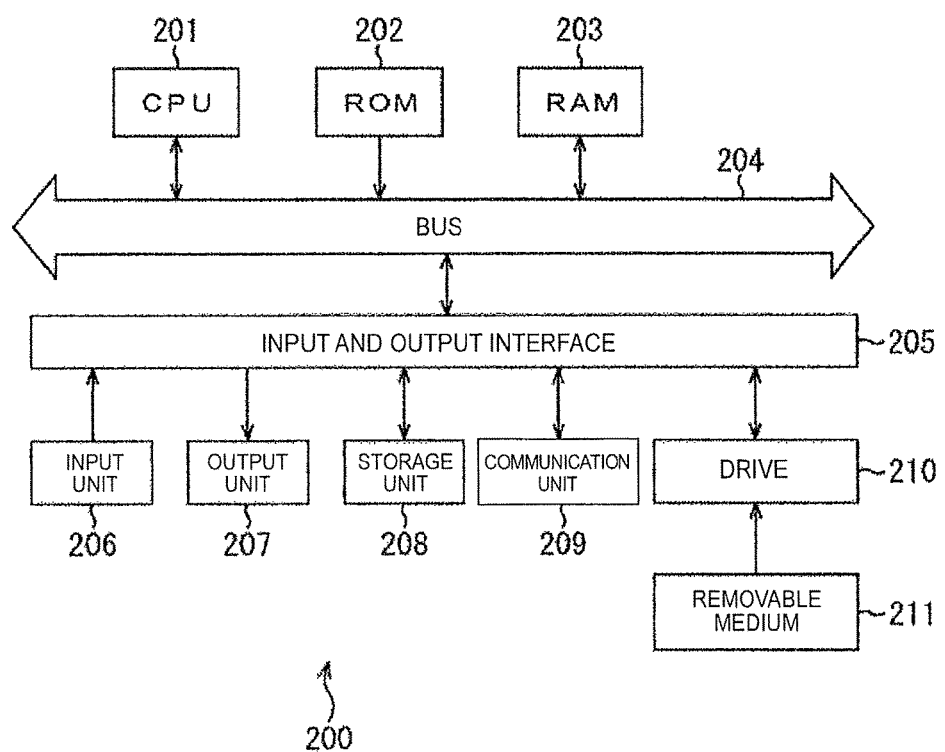
FIG. 12 is a block diagram showing a configuration example of a computer.

FIG. 12 is a block diagram showing a hardware configuration example of a computer described above.

In the computer 200, a CPU (Central Processing Unit) 201, a ROM (Read Only Memory) 202 and a RAM (Random Access Memory) 203 are mutually connected by a bus 204.

A input and output interface 205 is also connected to the bus 204. An input unit 206, an output unit 207, a storage unit 208, a communication unit 209, and a drive 210 are connected to the input and output interface 205.

The input unit 206 is configured from a keyboard, a mouse, a microphone or the like. The output unit 207 is configured from a display, a speaker or the like. The storage unit 208 is configured from a hard disk, a non-volatile memory or the like. The communication unit 209 is configured from a network interface or the like. The drive 210 drives a removable medium 211 such as a magnetic disk, an optical disc, a magneto-optical disk, a semiconductor memory or the like.

In the computer 200 configured as described above, the CPU 201 loads a program that is stored, for example, in the storage unit 208 onto the RAM 203 via the input and output interface 205 and the bus 204, and executes the program. Thus, the above-described series of processes is performed.

A program to be executed by the computer 200 (the CPU 201) is provided being recorded in the removable medium 211 which is, for example, a packaged medium or the like. In addition, a program can be provided via a wired or wireless transmission medium, such as a local area network, the Internet or digital satellite broadcasting.

In the computer 200, by loading the removable medium 211 onto the drive 210, the program can be installed into the storage unit 208 via the input and output interface 205. It also possible to receive the program from a wired or wireless transmission medium using the communication unit 209 and install the program into the storage unit 208. As another alternate, the program can be installed in advance in the ROM 202 or the storage unit 208.

Note that the program executed by the computer 200 may be a program in which processes are carried out in a time series in the order described in the present specification or may be a program in which processes are carried out in parallel or at necessary timing, such as when the processes are called.

Note that an embodiment of the present disclosure is not limited to the embodiment described above, and various changes and modifications may be made without departing from the gist of the present disclosure.

REFERENCE SIGNS LIST 10 content identification system
20 terminal device
21 content renderer
22 general-purpose ACR client
23 application manager
24 user interface
30 supply device
31 ACR Server
32 content server
33 application server
40 ACR gateway
41 ACR client
42 control unit
51 communication unit
52 ACR gateway detection unit
53 general-purpose request generation unit
54 analysis unit
61 communication unit
62 signature extraction unit
63 ACR query generation unit
64 ACR response analysis unit
71 content acquisition unit
72 signature extraction unit
73 ACR database
74 communication unit
75 ACR response generation unit
90 ACR capability
100 ACR query
110 ACR reference data
120 ACR response
200 computer
201 CPU

The invention claimed is:

1. A terminal device comprising:
a transmitter; and
circuitry configured to:
    detect a relay device accessible to the terminal device via a communication network;
    reproduce content;
    generate a request for the relay device to send a query in accordance with the content to one or more of a plurality of servers;
    control the transmitter to transmit the request to the relay device via the communication network;
    acquire a response to the request, the response received via the communication network from the relay device and including information from the one or more of the plurality of servers responsive to the query;
    acquire, responsive to the acquired response, an application; and
    execute the application to display additional information corresponding to the content.

2. The terminal device of claim 1, wherein the acquired response includes an identifier of the application and the additional information.

3. The terminal device of claim 1, wherein the circuitry is configured to acquire at least one of the application and the additional information from a storage of the terminal device or a server.

4. The terminal device of claim 1, wherein:
the query includes signature data extracted from the content, and
the acquired response includes an identification of the content.

5. The terminal device of claim 1, wherein the circuitry is configured to generate the request to include information for designating a server to be used from the plurality of servers.

6. The terminal device of claim 1, wherein the circuitry is configured to:
    receive, from the relay device, capability information of the relay device, the capability information indicating necessary information to be received from the terminal device, the necessary information including at least one of a size of the content, a frame rate of the content, a reproduction time of the content, and a time stamp; and
    generate the request to include the necessary information.

7. A method of a terminal device, the method comprising:
detecting, by circuitry of the terminal device, a relay device accessible to the terminal device via a communication network;
reproducing, by the circuitry, content;
generating, by the circuitry, a request for the relay device to send a query in accordance with the content to one or more of a plurality of servers;
transmitting, by the circuitry, the request to the relay device via the communication network;
acquiring, by the circuitry, a response to the request, the response received via the communication network from the relay device and including information from the one or more of the plurality of servers responsive to the query;
acquiring, by the circuitry, responsive to the acquired response, an application; and
executing, by the circuitry, the application to display additional information corresponding to the content.

8. The method of claim 7, wherein the acquired response includes an identifier of the application and the additional information.

9. The method of claim 7, further comprising:
acquiring, by the circuitry, at least one of the application and the additional information from a storage of the terminal device or a server.

10. The method of claim 7, wherein:
the query includes signature data extracted from the content, and
the acquired response includes an identification of the content.

11. The method of claim 7, further comprising:
generating, by the circuitry, the request to include information for designating a server to be used from the plurality of servers.

12. A non-transitory computer readable medium storing computer executable instructions that, when executed by a terminal device including circuitry, cause the circuitry to carry out the method of claim 7.

13. A relay device comprising:
circuitry configured to:
receive, via a communication network, content reproduced by a terminal device and a request from the terminal device, wherein the relay device is accessible to the terminal device via the communication network;
extract signature data from the content;
generate a query including the signature data;
transmit the query to one or more of a plurality of identification servers to request identification of the content;
receive a result of the identification of the content from the one or more of the plurality of identification servers; and
provide a response for the terminal device, the response containing the result of the identification of the content received from the one or more of the plurality of identification servers, wherein
an application to display additional information corresponding to the content is acquired by the terminal device responsive to the response.

14. The relay device of claim 13, wherein the relay device is configured to include one or more identification clients, each identification client being associated with one of the plurality of identification servers.

15. The relay device of claim 13, wherein the circuitry is configured to notify the terminal device of information relating to the plurality of identification servers.

16. The relay device of claim 13, wherein the circuitry is configured to:
convert the response into a data form suitable for the terminal device;
send the response to a server; and
notify the terminal device of information representing the server.

17. The relay device of claim 13, wherein the circuitry is configured to transmit capability information to the terminal device, the capability information indicating necessary information to be received from the terminal device, the necessary information including at least one of a size of the content, a frame rate of the content, a reproduction time of the content, and a time stamp.

18. The relay device of claim 13, wherein the circuitry is configured to access the one or more of the plurality of identification servers via a further communication network, including to transmit the query to and receive the response from the one or more of the plurality of identification servers via the further communication network.

19. A method of a relay device comprising:
receiving, by circuitry of the relay device, via a communication network, content reproduced by a terminal device and a request from the terminal device, wherein the relay device is accessible to the terminal device via the communication network;
extracting, by the circuitry of the relay device, signature data from the content;
generating, by the circuitry of the relay device, a query including the signature data;
transmitting, by the circuitry of the relay device, the query to one or more of a plurality of identification servers to request identification of the content;
receiving, by the circuitry of the relay device, a result of the identification of the content from the one or more of the plurality of identification servers; and
providing, by the circuitry of the relay device, a response for the terminal device, the response containing the result of the identification of the content received from the one or more of the plurality of identification servers, wherein
an application to display additional information corresponding to the content is acquired by the terminal device responsive to the response.

20. A non-transitory computer readable medium storing computer executable instructions that, when executed by a relay device including circuitry, cause the circuitry to may out the method of claim 19.

21. The terminal device of claim 1, wherein the circuitry is configured to control the transmitter to transmit the content to the relay device via the communication network.

22. The method of claim 7, further comprising:
transmitting, by the circuitry, the content to the relay device via the communication network.

* * * * *